United States Patent
Shimizu

(10) Patent No.: US 11,364,745 B2
(45) Date of Patent: Jun. 21, 2022

(54) PNEUMATIC TIRE

(71) Applicant: The Yokohama Rubber Co., LTD., Tokyo (JP)

(72) Inventor: Masatoshi Shimizu, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 194 days.

(21) Appl. No.: 16/477,884

(22) PCT Filed: Dec. 26, 2017

(86) PCT No.: PCT/JP2017/046761
§ 371 (c)(1),
(2) Date: Jul. 13, 2019

(87) PCT Pub. No.: WO2018/131475
PCT Pub. Date: Jul. 19, 2018

(65) Prior Publication Data
US 2019/0344622 A1     Nov. 14, 2019

(30) Foreign Application Priority Data
Jan. 13, 2017  (JP) .............................. JP2017-004335

(51) Int. Cl.
*B60C 11/12* (2006.01)
*B60C 11/00* (2006.01)
*B60C 11/04* (2006.01)

(52) U.S. Cl.
CPC ...... *B60C 11/1204* (2013.01); *B60C 11/0083* (2013.01); *B60C 11/04* (2013.01);
(Continued)

(58) Field of Classification Search
CPC . B60C 11/1204; B60C 11/0083; B60C 11/04; B60C 11/1236; B60C 11/1259;
(Continued)

(56) References Cited

U.S. PATENT DOCUMENTS

| | | | |
|---|---|---|---|
| 2009/0218020 A1* | 9/2009 | Sumi ...................... | B60C 11/12 152/209.18 |
| 2015/0020937 A1* | 1/2015 | Nakamura .............. | B60C 11/13 152/209.8 |

(Continued)

FOREIGN PATENT DOCUMENTS

| | | |
|---|---|---|
| JP | 2013/0035345 | 2/2013 |
| JP | 2015/0134575 | 7/2015 |

(Continued)

OTHER PUBLICATIONS

International Search Report for International Application No. PCT/JP2017/046761 dated Jan. 30, 2018, 3 pages, Japan.

*Primary Examiner* — Jeffrey M Wollschlager
*Assistant Examiner* — Shibin Liang
(74) *Attorney, Agent, or Firm* — Thorpe North & Western

(57) ABSTRACT

A pneumatic tire includes, in a tread portion, main grooves extending in a circumferential direction; ribs defined by the main grooves; at least one rib comprising sipes extending in a lateral direction; the sipes comprising a chamfered sipe with a chamfer portion provided on at least one edge, and a non-chamfered sipe with no chamfer portion provided on an edge; the chamfered sipe comprising one end portion terminating in the at least one rib and another end portion communicating with one of the main grooves located on either side of the at least one rib; a plurality of the chamfered sipes communicating with one of the main grooves located on either side of the at least one rib being alternately disposed in the circumferential direction; and the non-chamfered sipe being disposed close to the chamfered sipe on at least one side in the circumferential direction.

20 Claims, 9 Drawing Sheets

(52) U.S. Cl.
CPC ...... *B60C 11/1236* (2013.01); *B60C 11/1259* (2013.01); *B60C 2011/1209* (2013.01); *B60C 2011/1268* (2013.01)

(58) Field of Classification Search
CPC ..... B60C 2011/1209; B60C 2011/1268; B60C 11/03
See application file for complete search history.

(56) References Cited

U.S. PATENT DOCUMENTS

| | | | |
|---|---|---|---|
| 2016/0236517 A1 | 8/2016 | Nagase | |
| 2017/0297378 A1 | 10/2017 | Honda | |
| 2018/0072105 A1* | 3/2018 | Wakasugi | ........... B60C 11/1218 |
| 2018/0178589 A1* | 6/2018 | Horiguchi | ........... B60C 11/0304 |

FOREIGN PATENT DOCUMENTS

| | | |
|---|---|---|
| JP | 2015/0134581 | 7/2015 |
| JP | 2016/0088469 | 5/2016 |
| JP | 2016/0113003 | 6/2016 |
| JP | 2016/0150601 | 8/2016 |
| WO | WO 2016/075922 | 5/2016 |

* cited by examiner

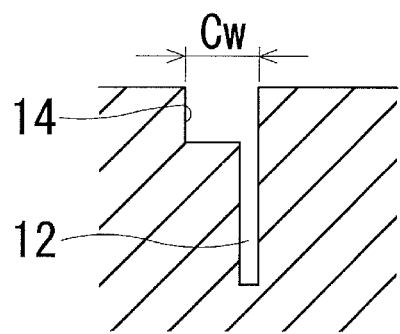
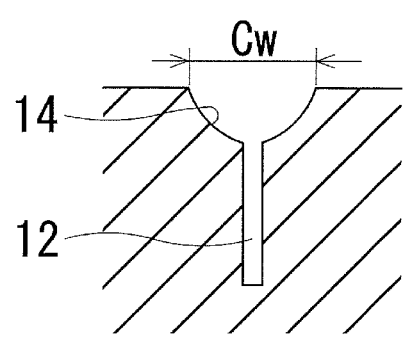
FIG. 8A  FIG. 8B
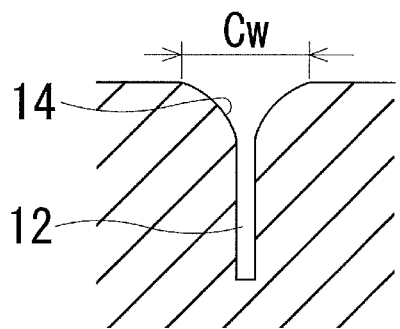
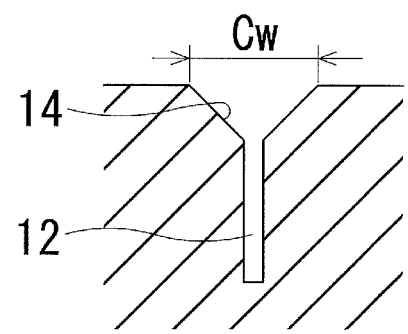
FIG. 8C  FIG. 8D

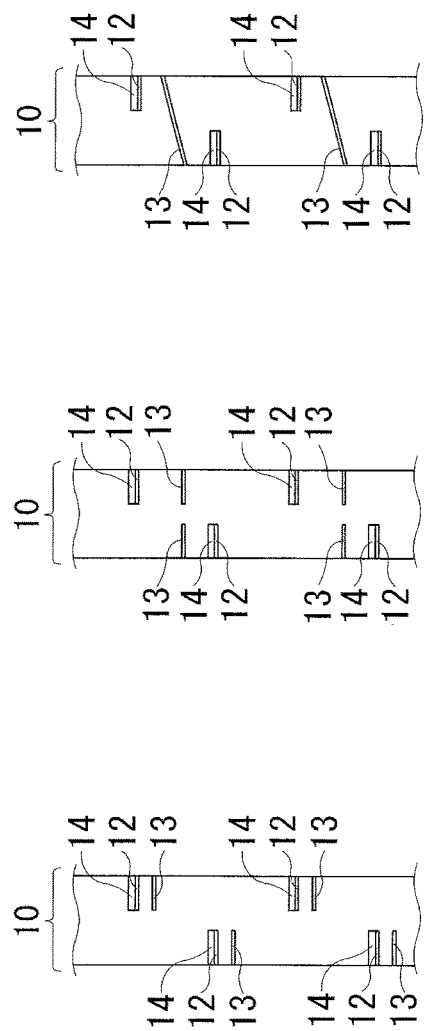
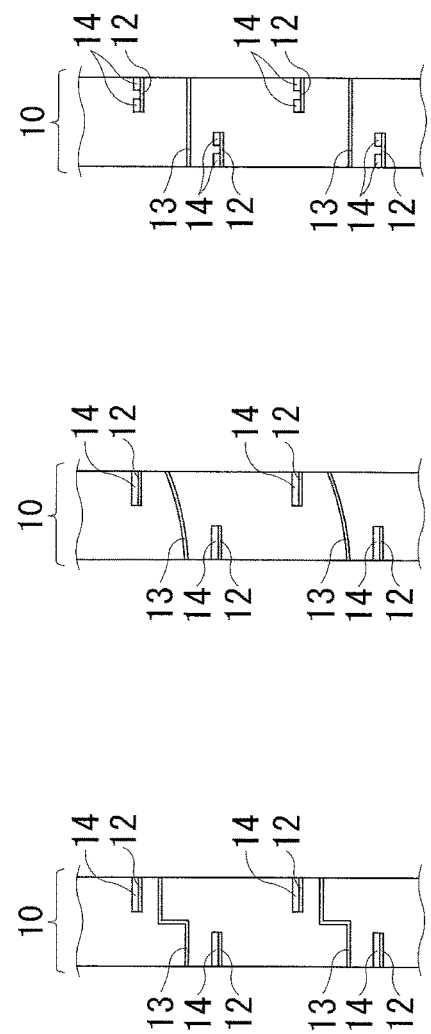
FIG. 9A FIG. 9B FIG. 9C
FIG. 9D FIG. 9E FIG. 9F

PNEUMATIC TIRE

TECHNICAL FIELD

The present technology relates to a pneumatic tire and particularly relates to a pneumatic tire with improved wet performance by devising shapes of sipes provided in its tread portion.

BACKGROUND ART

In general, a pneumatic tire includes a tread portion provided with a plurality of grooves and sipes to obtain wet performance. To improve braking performance which is an index of tire performance on a wet road surface, the grooves and the sipes are required to be improved in drainage performance.

As a method of improving drainage performance, providing a chamfer portion in an edge of a sipe provided in a tread portion has been proposed (e.g., Japan Unexamined Patent Publication No. 2016-88469). In this case, the chamfer portion serves as a discharge channel to improve drainage performance of a ground contact surface, so that improvement in tire wet performance is expected. Unfortunately, in a configuration in which a chamfer portion is simply added to a sipe, the chamfer portion is crushed due to deformation of a tread portion at contact with the ground, so the chamfer portion may not effectively serve as a discharge channel. Thus, drainage performance may not be sufficiently secured.

SUMMARY

The present technology provides a pneumatic tire with improved wet performance by devising shapes of sipes provided in its tread portion.

A pneumatic tire according to an embodiment of the present technology includes:

in a tread portion, a plurality of main grooves extending in a tire circumferential direction;

a plurality of ribs defined by the plurality of main grooves;

at least one rib of the plurality of ribs comprising a plurality of sipes extending in a tire lateral direction;

the plurality of sipes including a chamfered sipe with a chamfer portion provided on at least one edge, and a non-chamfered sipe with no chamfer portion provided on an edge;

the chamfered sipe including one end portion terminating in the at least one rib, and another end portion communicating with one of the plurality of main grooves located on either side of the at least one rib;

a plurality of the chamfered sipes communicating with one of the plurality of main grooves located on either side of the at least one rib being alternately disposed in the tire circumferential direction; and the non-chamfered sipe being disposed close to the chamfered sipe on at least one side in the tire circumferential direction.

In an embodiment of the present technology, at least one rib of the plurality of ribs includes the plurality of sipes extending in the tire lateral direction, and the sipes include the chamfered sipe with the chamfered portion provided on at least one edge, and the non-chamfered sipe with no chamfer portion provided on an edge. This structure enables drainage performance at contact with the ground to be improved due to the chamfered sipe provided with a chamfer portion to result in improvement of wet performance. Meanwhile, the non-chamfered sipe provided with no chamfer portion is provided together in the same rib as the chamfered sipe close to the chamfered sipe in the tire circumferential direction, so that the non-chamfered sipe bears deformation of the tread portion at contact with the ground. This contributes to suppression of crush of a chamfer portion of the chamfered sipe. In addition, the chamfered sipe includes one end portion terminating in the rib, and the other end portion communicating with any one of the main grooves located on either side of the rib, and the chamfered sipes communicating with both the main grooves located on either side of the rib are alternately disposed in the tire circumferential direction. This structure enables a ground contact region to be widely secured around the chamfered sipe, so that crush of the chamfer portion of the chamfered sipe can be effectively suppressed. This enables improvement in wet performance.

In an embodiment of the present technology, a distance L1 between the non-chamfered sipe closest to the chamfered sipe and the chamfered sipe in the tire circumferential direction is preferably from 2 mm to 15 mm, This enables crush of a chamfer portion of the chamfered sipe to be effectively suppressed.

In an embodiment of the present technology, a depth Cd of the chamfered sipe and a depth Nd of the non-chamfered sipe preferably satisfy the relationship $1<Nd/Cd \le 1.5$. This enables crush of a chamfer portion of the chamfered sipe to be effectively suppressed.

In an embodiment of the present technology, an inclination angle $\theta_C$ of the chamfered sipe with respect to the tire circumferential direction and an inclination angle $\theta_N$ of the non-chamfered sipe with respect to the tire circumferential direction preferably satisfy the relationship $\theta_C-30° \le \theta_N \le \theta_C 30°$. This enables crush of a chamfer portion of the chamfered sipe to be effectively suppressed.

In an embodiment of the present technology, the non-chamfered sipe is preferably disposed on each side of the chamfered sipe in the tire circumferential direction. This enables crush of a chamfer portion of the chamfered sipe to be effectively suppressed.

In an embodiment of the present technology, the non-chamfered sipe preferably increases in width gradually from a bottom portion toward an opening. This enables crush of a chamfer portion of the chamfered sipe to be effectively borne.

In an embodiment of the present technology, an opening of the chamfered sipe in a ground contact surface preferably has a width Cw of from 1.6 mm to 4.8 mm. This enables drainage performance at contact with the ground to be secured.

In an embodiment of the present technology, chamfer portion preferably has a rectangular cross-sectional shape in a cross-sectional view orthogonal to an extension direction of the chamfered sipe. This enables a groove volume to be sufficiently secured against deformation of the tread portion at a contact with the ground, so that drainage performance can be improved.

In an embodiment of the present technology, the non-chamfered sipe preferably extends through the at least one rib in the tire lateral direction. This enables crush of a chamfer portion of the chamfered sipe to be effectively suppressed.

In an embodiment of the present technology, a curvature radius TR of an arc forming a tread profile and a curvature radius RR of an outer contour line of the at least one rib including the chamfered sipe preferably satisfy the relationship TR>RR. This enables improvement in drainage performance of the rib at contact with the ground, so that wet performance can be effectively improved.

In the embodiments of the present technology, a "regular rim" is a rim defined by a standard for each tire according to a system of standards that includes standards on which tires are based, and refers to a "standard rim" in the case of JATMA (The Japan Automobile Manufacturers Association), refers to a "design rim" in the case of TRA (The Tire and Rim Association, Inc.), and refers to a "measuring rim" in the case of ETRTO (The European Tyre and Rim Technical Organisation). "Regular internal pressure" is an air pressure defined by standards for each tire according to a system of standards that includes standards on which tires are based, and refers to a "maximum air pressure" in the case of JATMA, refers to the maximum value in the table of "TIRE LOAD LIMITS AT VARIOUS COLD INFLATION PRESSURES" in the case of TRA, and refers to the "INFLATION PRESSURE" in the case of ETRTO. The "regular internal pressure" is 180 kPa for a tire on a passenger vehicle.

BRIEF DESCRIPTION OF DRAWINGS

FIGS. 8A to 8D each illustrate another modified example of a chamfered sipe formed in a tread portion of a pneumatic tire according to an embodiment of the present technology, and FIGS. 8A to 8D each are a cross-sectional view of each modified example.

FIGS. 9A to 9F each illustrate another modified example of a chamfered sipe and a non-chamfered sipe formed in a tread portion of a pneumatic tire according to an embodiment of the present technology, and FIGS. 9A to 9F each are a plan view of each modified example.

DETAILED DESCRIPTION

Figure 1:
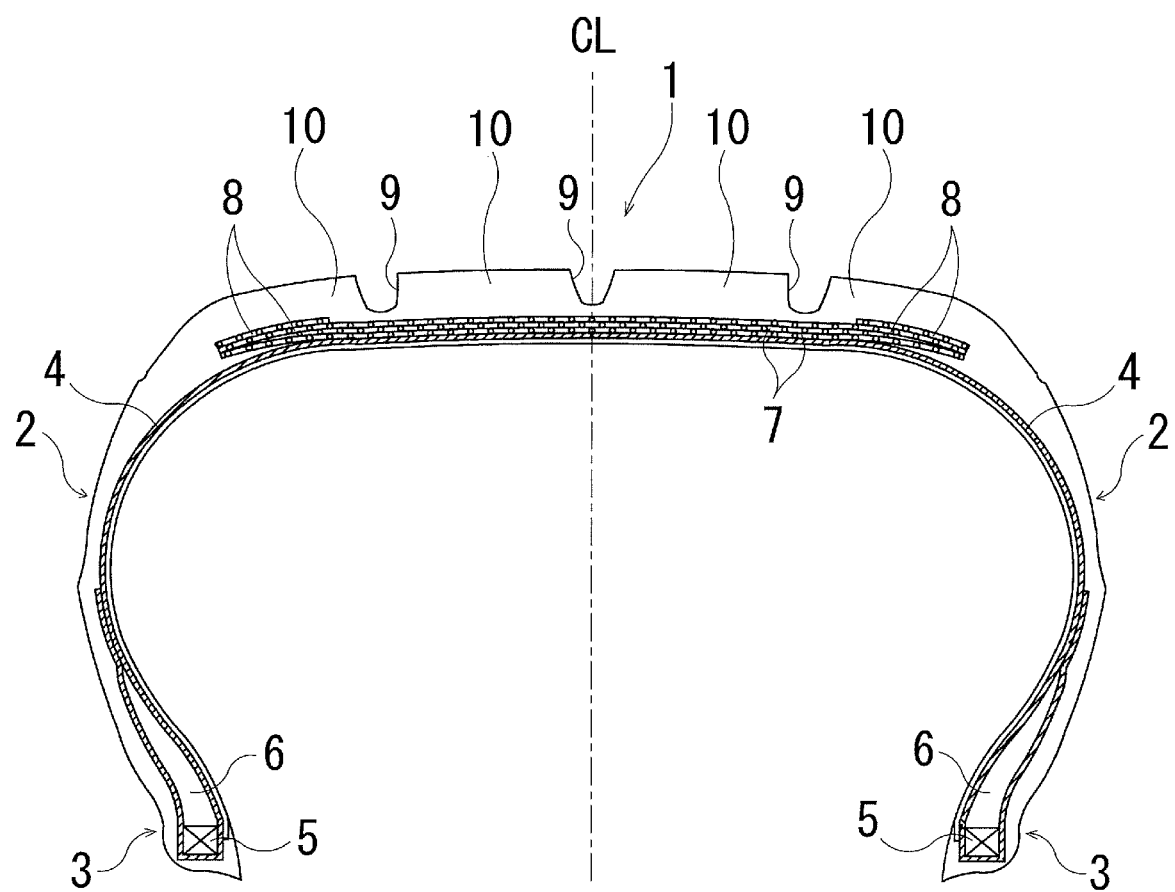
FIG. 1 is a meridian cross-sectional view illustrating a pneumatic tire according to an embodiment of the present technology.
Figure 2:
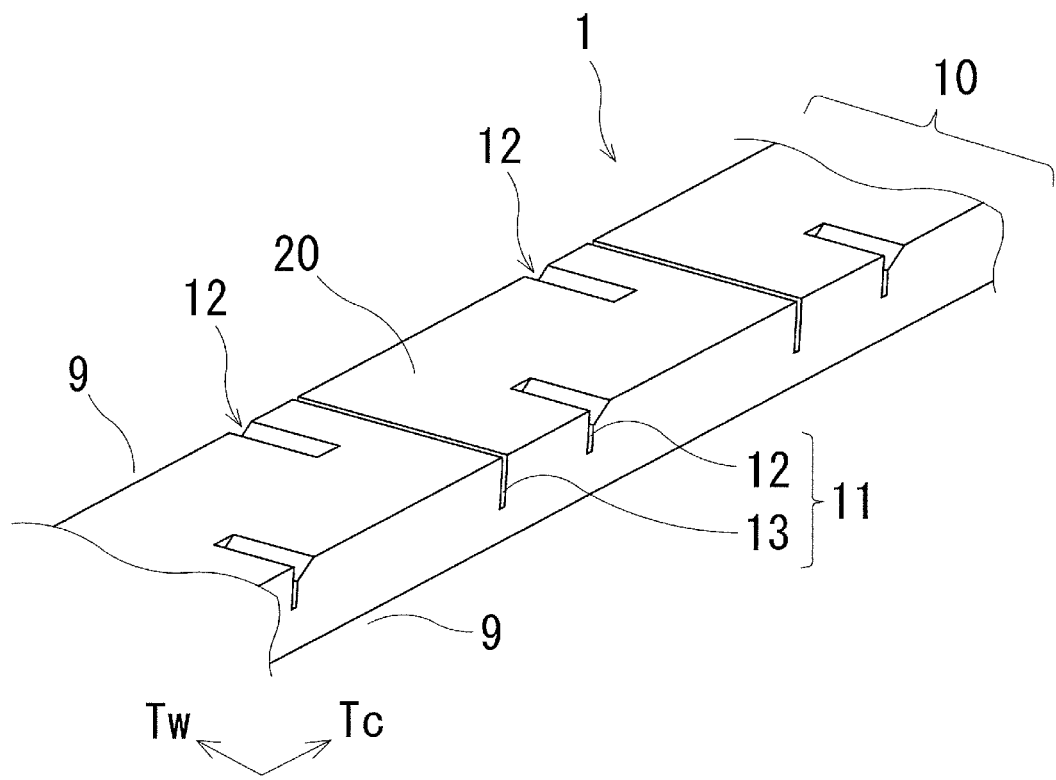
FIG. 2 is a perspective view illustrating a part of a tread portion of a pneumatic tire according to an embodiment of the present technology.
Figure 3:
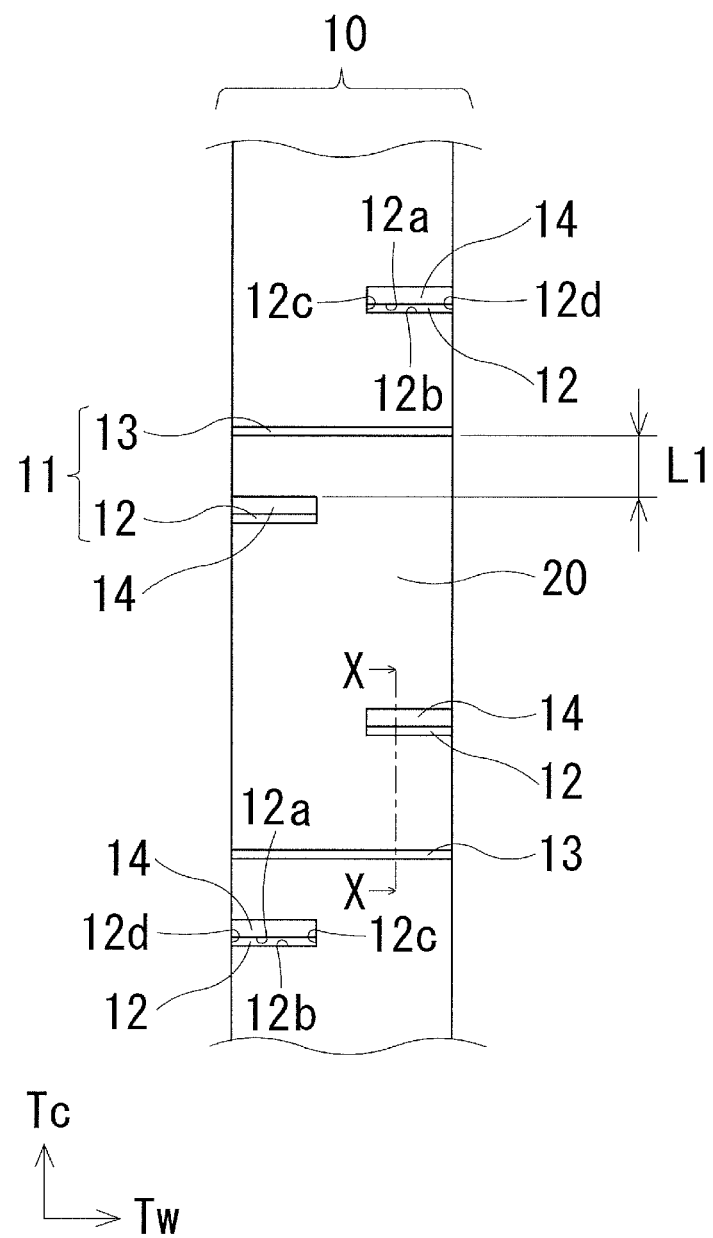
FIG. 3 is a plan view illustrating a part of a tread portion of a pneumatic tire according to an embodiment of the present technology.

Configurations of embodiments of the present technology will be described in detail below with reference to the accompanying drawings. FIG. 1 illustrates a pneumatic tire according to an embodiment of the present technology, and FIGS. 2 to 4 each illustrate a part of a tread portion of the pneumatic tire. In FIG. 1, CL denotes a tire equator line. In FIGS. 2 and 3, Tc denotes a tire circumferential direction, and Tw denotes a tire lateral direction.

As illustrated in FIG. 1, a pneumatic tire according to an embodiment of the present technology includes a tread portion 1 in an annular shape extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in the bead portions 3 from a tire inner side to a tire outer side. A bead filler 6 having a triangular cross-sectional shape formed from a rubber composition is disposed on the outer circumference of the bead core 5.

A plurality of belt layers 7 is embedded on an outer circumferential side of the carcass layer 4 in the tread portion 1. The belt layers 7 include a plurality of reinforcing cords that is inclined with respect to the tire circumferential direction with the reinforcing cords of the different layers arranged in a criss-cross manner. In the belt layers 7, an inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8, formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

The tread portion 1 is also provided with a plurality of main grooves 9 extending in the tire circumferential direction. The main grooves 9 define a plurality of ribs 10 in the tread portion 1. FIG. 1 illustrates an example in which the tread portion 1 is provided with three main grooves 9. The tread portion 1 is preferably provided with three to five main grooves 9 to achieve drainage performance and securing ground contact area.

Note that the tire internal structure described above represents a typical. example for a pneumatic tire, and the pneumatic tire is not limited thereto.

As illustrated in FIG. 2, a rib 10 of the plurality of ribs 10 includes a plurality of sipes 11 extending in the tire lateral direction, and blocks 20 defined by the plurality of sipes 11. The blocks 20 are disposed side by side in the tire circumferential direction. Meanwhile, a sipe 11 of the plurality of sipes 11 includes a chamfered sipe 12 and a non-chamfered sipe 13. The sipe 11 is a thin groove having a groove width of from 0.5 mm to 1.6 mm and a depth of 2.0 mm or greater when the tire is not mounted on a rim.

Figure 4:
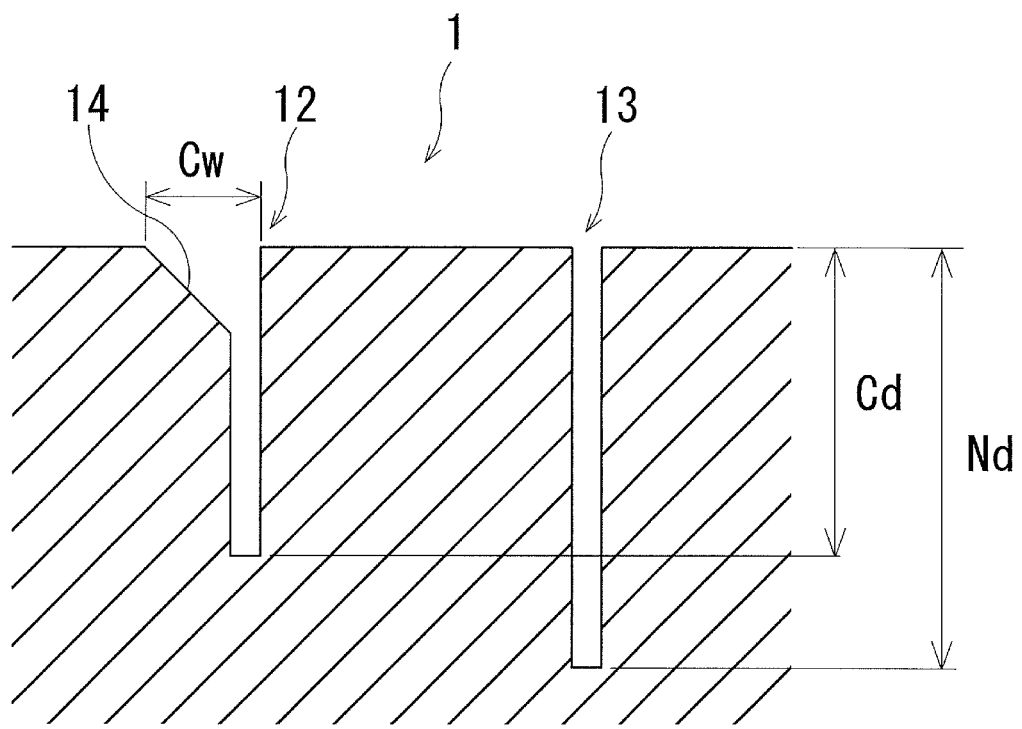
FIG. 4 is a cross-sectional view taken along line X-X of FIG. 3.

As illustrated in FIG. 3, the chamfered sipe 12 includes a chamfer portion 14 on at least one of edges 12a, 12b. In the embodiment illustrated in FIGS. 2 and 3, the chamfer portion 14 is provided on the edge 12a on one side throughout overall length of the chamfered sipe 12. In other embodiments, the chamfer portion 14 can be provided on the edges 12a, 12b on both sides, or also can be provided partially or intermittently along an extension direction of the chamfered sipe 12. The chamfered sipe 12 includes one end portion 12c terminating in the rib 10, and another end portion 12d communicating with any one of the main grooves 9, 9 positioned on either side of the rib 10. The chamfered sipes 12, 12 in communication with the corresponding main grooves 9, 9 positioned on either side of the rib 10 are alternately disposed in the tire circumferential direction, so that the chamfered sipes 12 are disposed in the tire circumferential direction in a staggered manner as a whole. As illustrated in FIG. 4, the chamfer portion 14 formed on the chamfered sipe 12 is in the shape of a triangle in a cross-sectional view orthogonal to the extension direction of the chamfered sipe 12. The portion of the chamfered sipe 12 excluding the chamfer portion 14 has a depth of 1 mm or greater.

The non-chamfered sipe 13 is provided in a region within 50 mm from the chamfered sipe 12 in the tire circumferential direction, and is provided with no chamfer. The non-chamfered sipe 13 is disposed close to at least one side of the chamfered sipe 12 in the tire circumferential direction. The non-chamfered sipe 13 may be inclined from the tire lateral direction, or may be bent or curved.

The rib 10 may be provided with another groove other than the chamfered sipe 12 and the non-chamfered sipe 13. However, drainage performance in the rib 10 can be sufficiently secured by the chamfered sipe 12. Thus, providing only the chamfered sipe 12 and the non-chamfered sipe 13 is preferable from a viewpoint of improving braking performance by increasing ground contact area.

While a tread rubber with low hardness is favorable for increasing ground contact area, a tread rubber with high hardness is favorable for suppressing crush of the chamfer portion 14. To satisfy both, the tread rubber preferably has a hardness from 58 to 75 specified by JIS (Japanese Industrial Standard) K6253.

In the pneumatic tire described above, at least one rib 10 of the plurality of ribs 10 includes the plurality of sipes 11 extending in the tire lateral direction, and the sipes 11 include the chamfered sipe 12 provided on at least one of the edges 12a, 12b with the chamfer portion 14, and the non-chamfered sipe 13 provided on an edge with no chamfer. This structure enables drainage performance when a tire contacts the ground to be improved due to the chamfered sipe 12 provided with the chamfer portion 14 to result in improvement of wet performance. The non-chamfered sipe 13 provided with no chamfer portion is provided together in the same rib 10 as the chamfered sipe 12 and close to the chamfered sipe 12 in the tire circumferential direction, so that the non-chamfered sipe 13 bears deformation of the tread portion 1 at contact with the ground. This contributes to suppression of crush of the chamfer portion 14 of the chamfered sipe 12.

In addition, the chamfered sipe 12 includes one end portion 12c terminating in the rib 10, and the other end portion 12d communicating with any one of the main grooves 9 positioned on either side of the rib 10, and the chamfered sipes 12 communicating with the main grooves 9 located on either side of the rib 10 are alternately disposed in the tire circumferential direction. This structure enables a ground contact region to be widely secured around the chamfered sipe 12, so that crush of the chamfer portion 14 of the chamfered sipe 12 can be effectively suppressed. This enables improvement in wet performance.

As illustrated in FIG. 3, in the pneumatic tire, a distance in tire circumferential direction between a recessed region of the chamfered sipe 12 including the chamfer portion 14, and a recessed region of the non-chamfered sipe 13 of non-chamfered sipes 13, at a position closest to the chamfered sipe 12, is indicated as a distance L1. The distance L1 is preferably from 2 mm to 15 mm, and more preferably from 4 mm to 11 mm. When the distance L1 is suitably set as described above, crush of the chamfer portion 14 of the chamfered sipe 12 can be effectively suppressed due to the non-chamfered sipe 13. When the distance L1 is less than 2 mm, rigidity of the rib 10 decreases in a region between the chamfered sipe 12 and the non-chamfered sipe 13. This causes contact with the ground to be difficult to secure, which can lead to a decrease in wet performance.

In FIG. 3, the non-chamfered sipe 13 extends through the rib 10 in the tire lateral direction. When the non-chamfered sipe 13 is formed as an open sipe extending through the rib 10 in the tire lateral direction as described above, the non-chamfered sipe 13 can bear more deformation of the tread portion 1 to enable crush of the chamfer portion 14 of the chamfered sipe 12 to be effectively suppressed. Meanwhile, the non-chamfered sipe 13 may be formed as a closed sipe with opposite ends terminating in the rib 10, or a semi-closed sipe with only one end terminating in the rib 10.

As illustrated in FIG. 4, depths of the chamfered sipe 12 and the non-chamfered sipe 13 from a ground contact surface to their groove bottoms are indicated as a depth Cd and a depth Nd, respectively. The depth Cd of the chamfered sipe 12 and the depth Nd of the non-chamfered sipe 13 preferably satisfy the relationship, $1 < Nd/Cd \leq 1.5$. The relationship, $1.1 < Nd/Cd \leq 1.4$, is more preferable. When the depth Nd of the non-chamfered sipe 13 is suitably set with respect to the depth Cd of the chamfered sipe 12 as described above, crush of the chamfer portion 14 of the chamfered sipe 12 can be effectively suppressed.

As illustrated in FIG. 4, a width of an opening of the chamfered sipe 12 in the ground contact surface is indicated as a width Cw. The width Cw of the opening is measured along a direction orthogonal to the extension direction of the chamfered sipe 12. At this time, the width Cw of the opening is preferably from 1.6 mm to 4.8 mm. When the chamfered sipe 12 is formed as described above, drainage performance at contact with the ground can be secured. When the width Cw of the opening of the chamfered sipe 12 in the ground contact surface is less than 1.6 mm, improvement effect of drainage performance is small. When the width Cw is greater than 4.8 mm, the ground contact area is reduced, causing braking performance on a wet road surface to tend to deteriorate.

Figure 5:
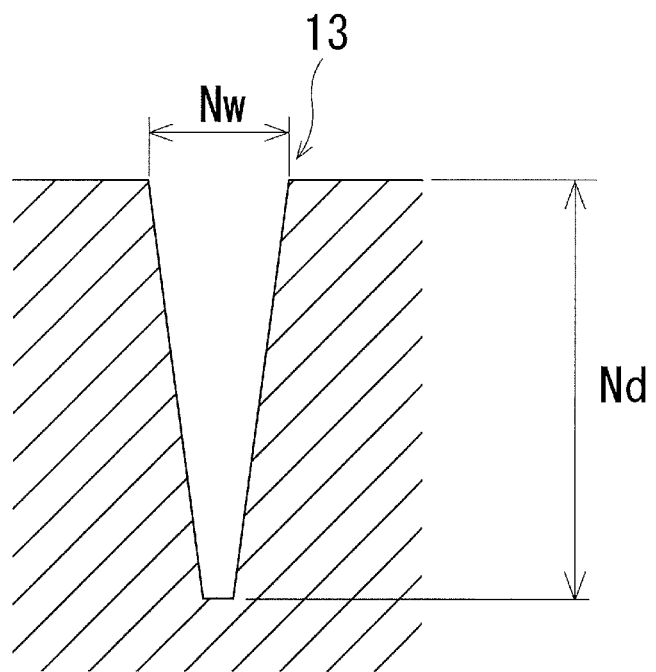
FIG. 5 is a cross-sectional view illustrating a modified example of a non-chamfered sipe formed in a tread portion of a pneumatic tire according to an embodiment of the present technology.

FIG. 5 illustrates a modified example of the non-chamfered sipe formed in the tread portion of the pneumatic tire according to an embodiment of the present technology. As illustrated in FIG. 5, a width of an opening of the non-chamfered sipe 13 in the ground contact surface is indicated as a width Nw. The width Nw of the opening is measured along a direction orthogonal to an extension direction of the non-chamfered sipe 13. In FIG. 5, the non-chamfered sipe 13 gradually increases in width Nw from its bottom portion toward its opening. When the non-chamfered sipe 13 is formed as described above, the non-chamfered sipe 13 can bear more deformation of the tread portion 1 to enable crush of the chamfer portion 14 of the chamfered sipe 12 to be effectively borne.

Figure 6:
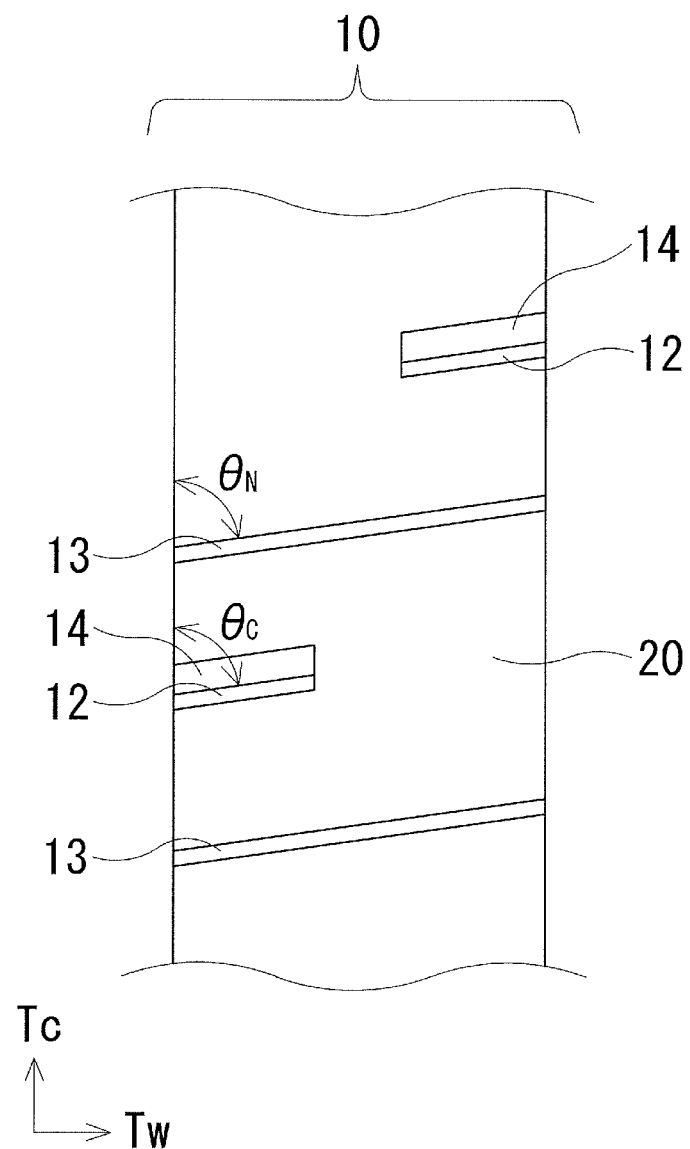
FIG. 6 is a plan view illustrating another modified example of a chamfered sipe and a non-chamfered sipe formed in a tread portion of a pneumatic tire according to an embodiment of the present technology.

FIG. 6 illustrates another modified example of the chamfered sipe and the non-chamfered sipe formed in the tread portion of the pneumatic tire according to an embodiment of the present technology. As illustrated in FIG. 6, the chamfered sipe 12 and the non-chamfered sipe 13 are inclined with respect to the tire circumferential direction. Inclination angles of the chamfered sipe 12 and the non-chamfered sipe 13 with respect to the tire circumferential direction are indicated as an inclination angle $\theta_C$ and an inclination angle $\theta_N$, respectively. The inclination angle $\theta_C$ of the chamfered sipe 12 and the inclination angle $\theta_N$ of the non-chamfered sipe 13 satisfy the relationship $\theta_C - 30° \leq \theta_N \leq \theta_C + 30°$. When the inclination angles $\theta_C$ and $\theta_N$ are set as described above, crush of the chamfer portion 14 of the chamfered sipe 12 can be effectively suppressed. The inclination angle $\theta_N$ of the non-chamfered sipe 13 is specified in a range equivalent to a length of the chamfered sipe 12 in the tire lateral direction.

In FIG. 6, the non-chamfered sipes 13 are disposed on either side of the chamfered sipe 12 in the tire circumferential direction. When the non-chamfered sipes 13 are disposed as described above, the non-chamfered sipe 13 can bear more deformation of the tread portion 1 of the non-chamfered sipe 13 to enable crush of the chamfer portion 14 of the chamfered sipe 12 to be effectively suppressed.

Figure 7:
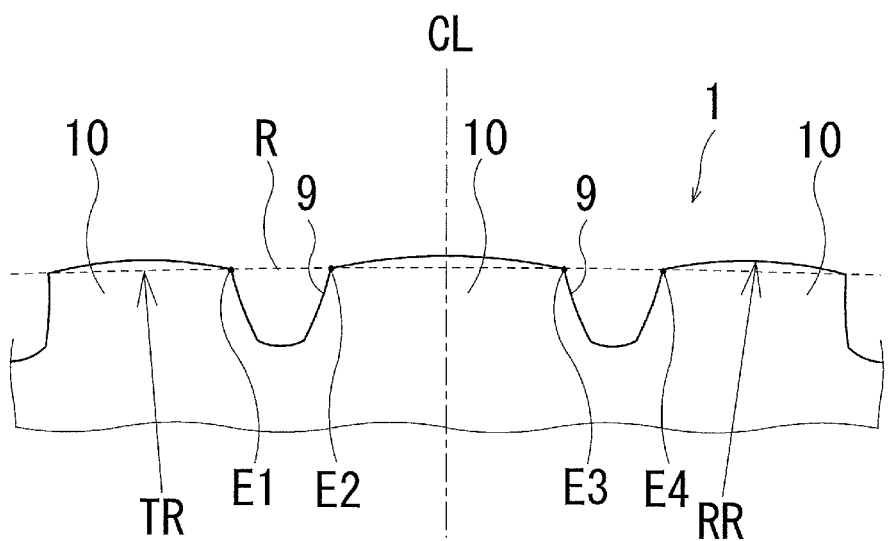
FIG. 7 is a cross-sectional view illustrating another modified example of a tread portion of a pneumatic tire according to an embodiment of the present technology.

FIG. 7 illustrates another modified example of the tread portion of the pneumatic tire according to an embodiment of the present technology. In FIG. 7, each rib 10 is provided with a chamfered sipe 12 and a non-chamfered sipe 13 as in the embodiments described above. An outer contour line defining a road contact surface of each of the ribs 10 projects outward from an arc R in the tire radial direction, the arc P, passing through opposite end points E1 and E2, and E3 and E4, of two respective main grooves 9 positioned in a tire central portion in the tire lateral direction in a tire meridian cross-sectional view. That is, a curvature radius TR of the arc R forming a tread profile and a curvature radius RR of the outer contour line of each of the ribs 10, including the chamfered sipe 12, satisfy the relationship TR>RR. This enables improvement in drainage performance of the rib 10 at contact with the ground, so that wet performance can be effectively improved. The curvature radius TR and the curvature radius RR are measured with the tire mounted on a regular rim and inflated to the regular internal pressure.

FIGS. 8A to 8D each illustrate another modified example of the chamfered sipe formed in the tread portion of the pneumatic tire according to an embodiment of the present technology. As illustrated in FIG. 8A, in a cross-sectional view orthogonal to the extension direction of the chamfered sipe 12, the chamfered sipe 12 is provided on one side with a chamfer portion 14, and the chamfer portion 14 has a rectangular cross-sectional shape. When the chamfer portion 14 is formed in a rectangular cross-sectional shape as described above, groove volume can be sufficiently secured against deformation of the tread portion 1 upon contact with the ground to enable drainage performance to be improved. In addition, examples of a cross-sectional shape of the chamfer portion 14 of the chamfered sipe 12 may include, other than that illustrated in each of FIGS. 4 and 8A, a chamfer portion having a contour line with a curve projecting inward in the tire radial direction as illustrated in FIG. 8B, a chamfer portion having a contour line with a curve projecting outward in the tire radial direction as illustrated in FIG. 8C, and a chamfer portion having a triangular shape as illustrated in FIG. 8D.

FIGS. 9A to 9F each illustrate another modified example of chamfered sipes and non-chamfered sipes formed in the tread portion of the pneumatic tire according to an embodiment of the present technology. Examples of shapes of chamfered sipes 12 and non-chamfered sipes 13 may include, other than that illustrated in each of FIGS. 2, 3, and 6, a structure in which the non-chamfered sipes 13 each have a length in the tire lateral direction equivalent to that of each of the chamfered sipes 12 and the non-chamfered sipes 13 are each provided with one end terminating in the rib 10, as illustrated in FIG. 9A, a structure in which the non-chamfered sipes 13 each have a length in the tire lateral direction equivalent to that of each of the chamfered sipes 12 and two non-chamfered sipes each provided with its one end terminating in the rib 10 are disposed facing each other, as illustrated in FIG. 9B, and a structure in which the non-chamfered sipes 13 are each inclined with respect to the tire lateral direction and each extend through the rib 10 in the tire lateral direction, as illustrated in FIG. 9C. The examples also may include a structure in which the non-chamfered sipes 13 each include a bent portion and extend through the rib 10 in the tire lateral direction, as illustrated in FIG. 9D, a structure in which the non-chamfered sipes 13 each have a curved shape and extend through the rib 10 in the tire lateral direction, as illustrated in FIG. 9E, and a structure in which the non-chamfered sipes 13 each extend through the rib 10 in the tire lateral direction and the chamfered sipes 12 each include chamfers 14 provided intermittently, as illustrated in FIG. 9F.

EXAMPLES

Using a pneumatic tire of the size 195/65R15 including, in a tread portion, a plurality of main grooves extending in the tire circumferential direction, and a plurality of ribs defined by a pair of the plurality of main grooves adjacent to each other, tires of Conventional Example, Comparative Examples 1, 2, and Examples 1 to 10 were produced according to Tables 1 and 2 showing: whether a chamfered sipe is provided; whether a non-chamfered sipe is provided; a distance L1 (mm) between a chamfered sipe and a non-chamfered sipe; a ratio (Nd/Cd) of a depth of a non-chamfered sipe to a depth of a chamfered sipe; a difference ($\theta_C - \theta_N$) between inclination angles of a chamfered sipe and a non-chamfered sipe; placement of a non-chamfered sipe (one side or both sides); a width of a non-chamfered sipe (uniform or gradual increase); a width Cw (mm) of an opening of a chamfered sipe in a ground contact surface; a cross-sectional shape of a chamfer portion; whether a non-chamfered sipe communicates with a main groove; and whether a rib projects outward in a tire radial direction.

These test tires were evaluated for braking performance on a wet road surface according to the following evaluation method. The results thereof are shown in Tables 1 and 2.

Braking performance on wet road surface:

Each of the test tires mounted on a wheel of the rim size 15×6J were mounted on a front-wheel drive car of 1500 cc displacement, and a braking distance of the car from an initial velocity of 80 km/h to complete stop was measured on a wet road surface with a water depth of 2 mm using each of the test tires under a pneumatics pressure of 230 kPa. The evaluation results were expressed, using the reciprocal of the measurement value, as index values, with Conventional Example being assigned as 100. Larger index values indicate more superior braking performance on a wet road surface.

TABLE 1

|  | Conventional Example | Comparative Example 1 | Comparative Example 2 |
|---|---|---|---|
| Chamfered sipe provided | Yes | No | No |
| Non-chamfered sipe provided | No | No | Yes |
| Distance L1 (mm) between chamfered sipe and non-chamfered sipe | — | — | — |

TABLE 1-continued

|  |  |  |  |
|---|---|---|---|
| Ratio of depth of non-chamfered sipe to depth of chamfered sipe (Nd/Cd) | — | — | — |
| Difference between inclination angles of chamfered sipe and non-chamfered sipe ($\theta_C - \theta_N$) | — | — | — |
| Placement of non-chamfered sipe (one side or both sides) | — | — | — |
| Width of non-chamfered sipe (uniform or gradual increase) | — | — | Uniform |
| Width Cw (mm) of opening of chamfered sipe in ground contact surface | 1.5 | — | — |
| Cross-sectional shape of chamfer portion | Triangle | — | — |
| Extends through of non-chamfered sipe to main groove | — | — | No |
| Projection of rib outward in tire radial direction | No | No | No |
| Braking performance on wet road surface | 100 | 95 | 96 |

|  | Example 1 | Example 2 | Example 3 | Example 4 |
|---|---|---|---|---|
| Chamfered sipe provided | Yes | Yes | Yes | Yes |
| Non-chamfered sipe provided | Yes | Yes | Yes | Yes |
| Distance L1 (mm) between chamfered sipe and non-chamfered sipe | 20 | 10 | 10 | 10 |
| Ratio of depth of non-chamfered sipe to depth of chamfered sipe (Nd/Cd) | 1.0 | 1.0 | 1.3 | 1.3 |
| Difference between inclination angles of chamfered sipe and non-chamfered sipe ($\theta_C - \theta_N$) | 50° | 50° | 50° | 20° |
| Placement of non-chamfered sipe (one side or both sides) | One side | One side | One side | One side |
| Width of non-chamfered sipe (uniform or gradual increase) | Uniform | Uniform | Uniform | Uniform |
| Width Cw (mm) of opening of chamfered sipe in ground contact surface | 1.5 | 1.5 | 1.5 | 1.5 |
| Cross-sectional shape of chamfer portion | Triangle | Triangle | Triangle | Triangle |
| Extends through of non-chamfered sipe to main groove | No | No | No | No |
| Projection of rib outward in tire radial direction | No | No | No | No |
| Braking performance on wet road surface | 103 | 104 | 105 | 106 |

TABLE 2

|  | Example 5 | Example 6 | Example 7 |
|---|---|---|---|
| Chamfered sipe provided | Yes | Yes | Yes |
| Non-chamfered sipe provided | Yes | Yes | Yes |
| Distance L1 (mm) between chamfered sipe and non-chamfered sipe | 10 | 10 | 10 |
| Ratio of depth of non-chamfered sipe to depth of chamfered sipe (Nd/Cd) | 1.3 | 1.3 | 1.3 |
| Difference between inclination angles of chamfered sipe and non-chamfered sipe ($\theta_C - \theta_N$) | 20° | 20° | 20° |
| Placement of non-chamfered sipe (one side or both sides) | Both sides | Both sides | Both sides |
| Width of non-chamfered sipe (uniform or gradual increase) | Uniform | Gradual increase | Gradual increase |
| Width Cw (mm) of opening of chamfered sipe in ground contact surface | 1.5 | 1.5 | 2.0 |
| Cross-sectional shape of chamfer portion | Triangle | Triangle | Triangle |
| Extends through of non-chamfered sipe to main groove | No | No | No |
| Projection of rib outward in tire radial direction | No | No | No |
| Braking performance on wet road surface | 107 | 108 | 110 |

|  | Example 8 | Example 9 | Example 10 |
|---|---|---|---|
| Chamfered sipe provided | Yes | Yes | Yes |
| Non-chamfered sipe provided | Yes | Yes | Yes |
| Distance L1 (mm) between chamfered sipe and non-chamfered sipe | 10 | 10 | 10 |
| Ratio of depth of non-chamfered sipe to depth of chamfered sipe (Nd/Cd) | 1.3 | 1.3 | 1.3 |
| Difference between inclination angles of chamfered sipe and non-chamfered sipe ($\theta_C - \theta_N$) | 20° | 20° | 20° |

TABLE 2-continued

| | | | |
|---|---|---|---|
| Placement of non-chamfered sipe (one side or both sides) | Both sides | Both sides | Both sides |
| Width of non-chamfered sipe (uniform or gradual increase) | Gradual increase | Gradual increase | Gradual increase |
| Width Cw (mm) of opening of chamfered sipe in ground contact surface | 2.0 | 2.0 | 2.0 |
| Cross-sectional shape of chamfer portion | Rectangle | Rectangle | Rectangle |
| Extends through of non-chamfered sipe to main groove | No | Yes | Yes |
| Projection of rib outward in tire radial direction | No | No | Yes |
| Braking performance on wet road surface | 111 | 112 | 113 |

As can be seen from Tables 1 and 2, the tires of Examples 1 to 10 have improved braking performance on a wet road surface due to the shape of the sipes provided in the tread portion, as compared with Conventional Example.

In Comparative Example 1, improvement effect of braking performance on a wet road surface could not be sufficiently obtained due to the rib being provided with no sipe. In Comparative Example 2, improvement effect of braking performance on a wet road surface could not be sufficiently obtained due to the rib being provided with only the sipes with no chamfer.

The invention claimed is:

1. A pneumatic tire comprising:
in a tread portion,
a plurality of main grooves extending in a tire circumferential direction;
a plurality of ribs defined by the plurality of main grooves;
at least one rib of the plurality of ribs comprising a plurality of sipes extending in a tire lateral direction;
the plurality of sipes comprising a chamfered sipe with a chamfer portion provided on at least one edge, and a non-chamfered sipe with no chamfer portion provided on an edge;
the chamfered sipe comprising one end portion terminating in the at least one rib, and another end portion communicating with one of the plurality of main grooves located on either side of the at least one rib;
the non-chamfered sipe comprising one end portion communicating with the one of the plurality of main grooves and another end portion communicating with another one of the plurality of main grooves defining the at least one rib, the non-chamfered sipe extending straightly from the one end portion to the another end portion;
a plurality of the chamfered sipes communicating with one of the plurality of main grooves located on either side of the at least one rib being alternately disposed in the tire circumferential direction; and
the non-chamfered sipe being disposed closest among the plurality of sipes to the chamfered sipe on at least one side in the tire circumferential direction.

2. The pneumatic tire according to claim 1, wherein a depth Cd of the chamfered sipe and a depth Nd of the non-chamfered sipe satisfy a relationship 1<Nd/Cd≤1.5.

3. The pneumatic tire according to claim 1, wherein an inclination angle $\theta_C$ of the chamfered sipe with respect to the tire circumferential direction and an inclination angle $\theta_N$ of the non-chamfered sipe with respect to the tire circumferential direction satisfy a relationship $\theta_C-30°\leq\theta_N\leq\theta_C+30°$.

4. The pneumatic tire according to claim 1, wherein the non-chamfered sipe is disposed on each side of the chamfered sipe in the tire circumferential direction.

5. The pneumatic tire according to claim 1, wherein the non-chamfered sipe increases in width gradually from a bottom portion toward an opening.

6. The pneumatic tire according to claim 1, wherein an opening of the chamfered sipe in a ground contact surface has a width Cw of from 1.6 mm to 4.8 mm.

7. The pneumatic tire according to claim 1, wherein the chamfer portion has a rectangular cross-sectional shape in a cross-sectional view orthogonal to an extension direction of the chamfered sipe.

8. The pneumatic tire according to claim 1, wherein the non-chamfered sipe extends through the at least one rib in the tire lateral direction.

9. The pneumatic tire according to claim 1, wherein a curvature radius TR of an arc forming a tread profile and a curvature radius RR of an outer contour line of the at least one rib comprising the chamfered sipe satisfy a relationship TR >RR.

10. The pneumatic tire according to claim 1, wherein ends of the at least one rib in the tire lateral direction are interrupted only by the plurality of sipes.

11. The pneumatic tire according to claim 1, wherein a distance L1 between the non-chamfered sipe closest to the chamfered sipe and the chamfered sipe in the tire circumferential direction is from 2 mm to 15 mm.

12. The pneumatic tire according to claim 11, wherein a depth Cd of the chamfered sipe and a depth Nd of the non-chamfered sipe satisfy a relationship 1<Nd/Cd≤1.5.

13. The pneumatic tire according to claim 12, wherein an inclination angle $\theta_C$ of the chamfered sipe with respect to the tire circumferential direction and an inclination angle $\theta_N$ of the non-chamfered sipe with respect to the tire circumferential direction satisfy a relationship $\theta_C-30°\leq\theta_N\leq\theta_C+30°$.

14. The pneumatic tire according to claim 13, wherein the non-chamfered sipe is disposed on each side of the chamfered sipe in the tire circumferential direction.

15. The pneumatic tire according to claim 14, wherein the non-chamfered sipe increases in width gradually from a bottom portion toward an opening.

16. The pneumatic tire according to claim 15, wherein an opening of the chamfered sipe in a ground contact surface has a width Cw of from 1.6 mm to 4.8 mm.

17. The pneumatic tire according to claim 16, wherein the chamfer portion has a rectangular cross-sectional shape in a cross-sectional view orthogonal to an extension direction of the chamfered sipe.

18. The pneumatic tire according to claim 17, wherein the non-chamfered sipe extends through the at least one rib in the tire lateral direction.

19. The pneumatic tire according to claim 18, wherein a curvature radius TR of an arc forming a tread profile and a curvature radius RR of an outer contour line of the at least one rib comprising the chamfered sipe satisfy a relationship TR>RR.

20. A pneumatic tire comprising:
in a tread portion,
a plurality of main grooves extending in a tire circumferential direction;
a plurality of ribs defined by the plurality of main grooves;
at least one rib of the plurality of ribs comprising a plurality of sipes extending in a tire lateral direction;

the plurality of sipes comprising a chamfered sipe with a chamfer portion provided on at least one edge, and a non-chamfered sipe with no chamfer portion provided on an edge;

the chamfered sipe comprising one end portion terminating in the at least one rib, and another end portion communicating with one of the plurality of main grooves located on either side of the at least one rib;

the non-chamfered sipe comprising one end portion communicating with the one of the plurality of main grooves and another end portion communicating with another one of the plurality of main grooves defining the at least one rib, the non-chamfered sipe having a constant depth along an entire length from the one end portion to the another end portion;

a plurality of the chamfered sipes communicating with one of the plurality of main grooves located on either side of the at least one rib being alternately disposed in the tire circumferential direction; and the non-chamfered sipe being disposed closest among the plurality of sipes to the chamfered sipe on at least one side in the tire circumferential direction.

\* \* \* \* \*